(12) United States Patent
Liu et al.

(10) Patent No.: US 6,879,469 B2
(45) Date of Patent: Apr. 12, 2005

(54) ADJUSTING MECHANISM FOR FLYING PICKUP HEAD IN DATA STORAGE DEVICE

(75) Inventors: Tzong-Shi Liu, Hsinchu (TW); Po-Ching Liu, Hsinchu (TW); Hsing-Cheng Yu, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 108 days.

(21) Appl. No.: 10/342,293

(22) Filed: Jan. 15, 2003

(65) Prior Publication Data

US 2004/0202094 A1 Oct. 14, 2004

(30) Foreign Application Priority Data

Nov. 27, 2002 (TW) ........................................ 91134399 A

(51) Int. Cl.[7] .......................... G11B 21/24; G11B 5/56; G11B 17/00; G11B 21/16; G11B 7/08; G11B 7/085; G11B 7/09
(52) U.S. Cl. ...................... 360/294.4; 369/250; 720/674
(58) Field of Search ............................. 369/250, 52.23, 369/52.28, 244, 244.1, 176; 720/674, 658, 672; 360/294.4, 114.03, 114.06, 240, 260, 264, 264.1, 266.2, 270, 294.3, 290, 294, 294.7, 294.1, 244.9

(56) References Cited

U.S. PATENT DOCUMENTS

| | | | | |
|---|---|---|---|---|
| 4,374,402 A | * | 2/1983 | Blessom et al. ......... | 360/266.2 |
| 6,590,748 B2 | * | 7/2003 | Murphy et al. .......... | 360/294.4 |
| 6,680,826 B2 | * | 1/2004 | Shiraishi et al. ......... | 360/294.4 |
| 2002/0089916 A1 | | 7/2002 | Lee et al. .................... | 369/222 |
| 2002/0105750 A1 | * | 8/2002 | Li et al. ....................... | 360/75 |

FOREIGN PATENT DOCUMENTS

JP   P2001-143425 A   5/2001

* cited by examiner

*Primary Examiner*—Julie Anne Watko
(74) *Attorney, Agent, or Firm*—Troxell Law Office PLLC

(57) ABSTRACT

The present invention provides a tuning mechanism for flying pickup heads in data storage devices. The pickup device includes a coil, a pivot, a suspension, and a piezoelectric bender. The piezoelectric bender made by a bi-layer or a multi-layer piezoelectric material is formed on one end of the suspension, and proper voltages applied to the piezoelectric bender via wires enable the piezoelectric bender to undergo both neutral axis displacement and bending deflection. A pickup head is attached to the free end of the piezoelectric bender opposite to the coil, and via the piezoelectric bender, focusing and tracking motion of the pickup head can be tuned at the same time. Furthermore, since the characteristic of the piezoelectric bender is similar to bimetallic elements, the bender can undergo large bending deflection to compensate large deformation of rotating optical disks, so that the flying height of the pickup head can be tuned to maintain a constant focusing distance in reading/writing data.

8 Claims, 3 Drawing Sheets

ADJUSTING MECHANISM FOR FLYING PICKUP HEAD IN DATA STORAGE DEVICE

REFERENCE CITED

1. U.S. patent application Ser. No.: 20020089916.
2. Japan patent application no.: P2001-143425A.

FIELD OF THE INVENTION

The present invention relates to a tuning mechanism for flying pickup heads in data storage devices, and more particularly, to simultaneously tuning focusing and tracking motion of the pickup head with a piezoelectric bender, and similar to bimetallic elements, the piezoelectric bender can undergo bending deflection to compensate large deformation of rotating optical/magnetic disks, so that the flying height of the pickup head can be controlled to maintain a constant focusing distance for facilitating reading/writing data.

BACKGROUND OF THE INVENTION

A pickup device is indispensable in an optical disk drive or a hard disk drive. As the description disclosed in the U.S. patent application Ser. No. 20020089916 and Japan patent application number P2001-143425A, the main characteristic of these two patents is that adhering or coating electrode layers and piezoelectric thin films onto the surface of a suspension arm, when an outer voltage is applied to the suspension arm, the suspension arm deforms to adjust the position of the pickup head due to extension of the piezoelectric thin films. During reading and writing data process of the optical disk drive or the hard disk drive, the flying height of the pickup head can be adjusted by piezoelectric thin films as disclosed by those two patents. However, tracking motion cannot be tuned with this kind of apparatus, and they only generate small bending deflection of the suspension arm, such that large deformation of rotating optical disks cannot be compensated. According to measurement results, the vibration amplitude of the optical disk surface reaches as large as 80 micrometers when an optical disk rotates at 5400 rpm (revolution per minute). Therefore, with this kind of apparatus, the pickup head of disk drives cannot be maintained in a focusing range.

SUMMARY OF THE INVENTION

It is therefore a primary objective of the present invention to simultaneously tune focusing and tracking motion of a pickup head with a piezoelectric bender, and since characteristics of the piezoelectric bender are similar to bimetallic elements, it can undergo large bending deflection to compensate large deformation of rotating optical disks.

It is another objective of the present invention that the flying height of a pickup head can be controlled in focusing range to facilitate reading/writing data. In order to achieve the aforementioned objectives, a tuning mechanism for flying pickup heads in data storage devices is provided in the present invention. The pickup device includes a coil, a pivot, a suspension connected to the pivot, and a piezoelectric bender. The piezoelectric bender made by a bi-layer or a multi-layer piezoelectric material is formed on the free end of the suspension, and voltages applied to the piezoelectric bender enable the piezoelectric bender to undergo both bending deflection and neutral axis displacement. A pickup head is formed on the free end of the piezoelectric bender opposite to the coil.

It is an advantage of the present invention that via the piezoelectric bender, focusing and tracking motion of the pickup head can be tuned at the same time. Furthermore, since the characteristics of the piezoelectric bender are similar to bimetallic elements, it can undergo large bending deflection to compensate large deformation of rotating optical disks, so that the flying height of the pickup head can be tuned to maintain a proper focusing distance for reading and writing data.

This and other objectives of the present invention will no doubt become obvious to those of ordinary skill in the art after having read the following detailed description of the preferred embodiment that is illustrated in the various figures and drawings.

BRIEF DESCRIPTION OF THE DRAWINGS

The present invention will be better understood from the following detailed description of preferred embodiments of the invention, taken in conjunction with the accompanying drawings, in which.

DETAILED DESCRIPTION OF THE PREFERRED EMBODIMENT

To achieve the above-described objectives of the present invention, techniques, methods, specific characteristics, and configuration of the present invention will be fully understood by means of a preferred exemplary embodiment with accompanying drawings described as follows.

Figure 1:
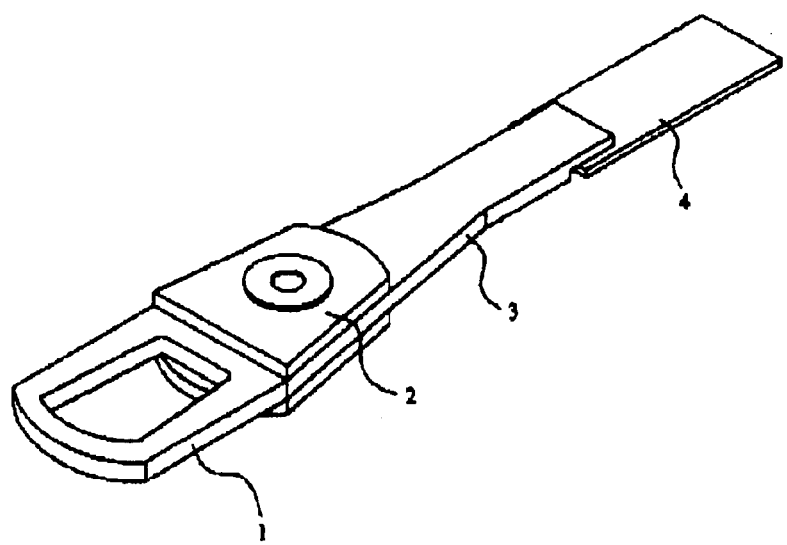
FIG. 1 is a schematic diagram of a pickup device according to the present invention.
Figure 2:
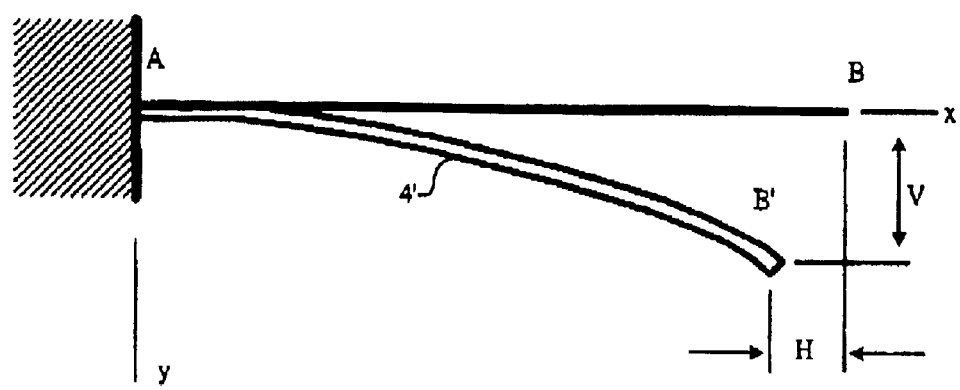
FIG. 2 is a schematic diagram of a cantilever beam having neutral axis displacement H and a bending deflection V at the free end of the beam according to mechanics of materials.
Figure 3:
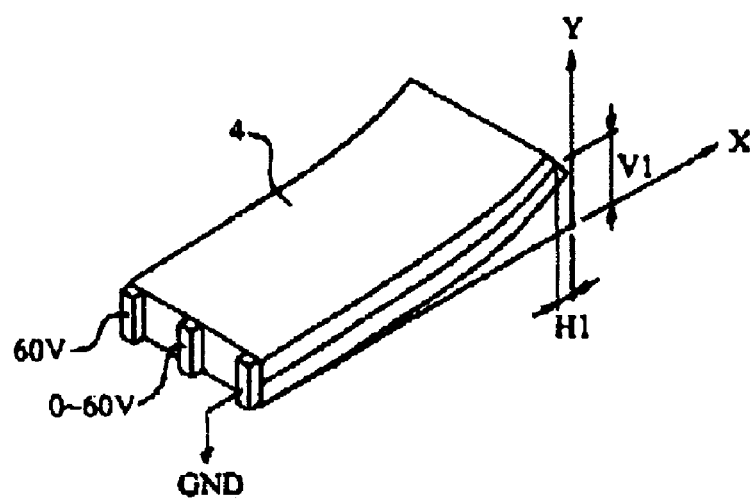
FIG. 3 is a schematic diagram of a piezoelectric bender having neutral axis displacement H1 and bending deflection V1 at the free end of the piezoelectric bender subject to applied voltages according to the present invention.

Please refer to FIG. 1 to FIG. 3. FIG. 1 shows a schematic diagram of a pickup for data storage devices according to the present invention. FIG. 2 depicts a schematic diagram of a cantilever beam 4' having neutral axis displacement H and bending deflection V at the free end B' of the cantilever beam according to mechanics of materials. In the same principle as FIG. 2, treating a piezoelectric bender as a cantilever beam, FIG. 3 is a schematic diagram of the piezoelectric bender 4 having neutral axis displacement H1 and deflection V1 at the free end of the piezoelectric bender subject to applied voltages according to the present invention. As shown in FIG. 1, a tuning mechanism for a flying pickup head in data storage devices is provided in the present invention. A pickup is indispensable in an optical disk drive, a hard disk drive, or a Magneto-Optical (MO) disk drive. And the pickup typically includes a coil 1, a pivot 2, and a suspension 3 connected to said pivot 2, wherein said suspension 3 rotates about pivot 2 due to electromagnetic forces that are induced by interaction between a permanent magnet in a voice coil motor (not shown) and the coil 1 with electric current. In the present invention a piezoelectric bender 4 formed on the free end of suspension 3 is made of lead zirconate titanate (PZT) or poly-vinylidene fluoride (PVDF). Said suspension 3 and said piezoelectric bender 4 can be formed to become an integrated member. Said piezoelectric bender 4 is a laminated construction with electrodes, such that when voltages are applied to said piezoelectric bender 4 the deformation direction of an upper layer is opposite to that of a lower layer. That is, when the upper layer is in an extension configuration, the lower layer is simultaneously in a shrinkage configuration, oppositely, when the lower layer is in an extension configuration, the upper layer is simultaneously in a shrinkage configuration. A head (not shown) is formed on, the free end of the piezoelectric bender 4. When proper voltages are applied to the piezoelectric bender 4 via wires, the piezoelectric bender 4 can undergo both neutral axis displacement and bending deflection. So that said pickup head not only moves under the actuation of the voice coil motor, but also can be precisely positioned by said piezoelectric bender 4. Via said piezoelectric bender 4, the position of said pickup head in both tracking and focusing directions can be tuned at the same time. Furthermore, since the characteristics of said piezoelectric bender 4 are similar to bimetallic elements, it can undergo large bending deflection up to hundreds micrometers to compensate large deformation of rotating optical disks, and the flying height can be regulated via bonder deflection. Hence, the flying height of the pickup head in the focusing direction can be tuned to maintain a constant focusing distance so as to facilitate reading/writing data of the pickup head. Besides, based on said neutral axis displacement of the bender, said pickup head accompanied by voice coil motor actuation can perform track-seeking and track-following. Hence, said pickup of the present invention can be used to achieve focusing and tracking control at the same time. Furthermore, due to fast response characteristics of said piezoelectric bender 4, which has a bandwidth of no less than 300 Hz, the present invention can position said pickup head instantaneously.

As shown in FIG. 2, in bending deformation configuration, cantilever beam 4' undergoes both bending deflection V along y-axis and neutral axis displacement H along x-axis. Therefore, based on this principle in mechanics of materials when voltages are applied to the piezoelectric bender 4 in FIG. 3 via three wires, said piezoelectric bender 4 also undergoes both bending deflection V1 along y-axis and neutral axis displacement H1 along x-axis. The present Invention uses this characteristic to form said pickup head on the free end of said piezoelectric bender 4, not only the prior art advantage of tracking motion by the voice coil motor can be achieved, focusing control by said bending deflection and track-seeking and track-following control by said neutral axis displacement can also be achieved by using said piezoelectric bender 4.

Using the aforementioned description, said pickup head of the present invention can achieve focusing and tracking control at the same time. And those skilled in the art will readily observe that numerous modifications and alterations of the device may be made while retaining the teaching of the invention. Accordingly, the above disclosure should be construed as limited only by the metes and bounds of the appended claims.

What is claimed is:

1. A tuning mechanism for a flying pickup head in data storage devices comprising: a coil, a pivot, a suspension connected to the pivot, and a piezoelectric bender, wherein a free end of the suspension is connected to the piezoelectric bender having at least two layers for a piezoelectric material, each of the at least two layers of piezoelectric material has a surface located adjacent to a surface of an adjacent one of the at least two layers of piezoelectric material, electrical electrodes are located on and connected to an end of each of the at least two layers of piezoelectric material, control voltages are applied by the electrical electrodes to the piezoelectric bender to generate a neutral axis displacement and a bending deflection simultaneously; the neutral axis displacement is in a direction perpendicular to a direction of the bending deflection, the flying pickup head is located on a free end of the piezoelectric bender; a device for tuning said neutral axis displacement and said bending deflection of said piezoelectric bender will respectively tune a cross-track motion and a flying height of said pickup head and maintain a constant flying height when reading and writing data.

2. The tuning mechanism for the flying pickup head in data storage devices according to claim 1, wherein said piezoelectric bender is a laminated construction of piezoelectric layers.

3. The tuning mechanism for the flying pickup head in data storage devices according to claim 1, wherein said suspension and said piezoelectric bender are an integrated member.

4. The tuning mechanism for the flying pickup head in data storage devices according to claim 1, wherein said piezoelectric bender is lead zirconate titanate material (PZT).

5. The tuning mechanism for the flying pickup head in data storage devices according to claim 1, wherein said piezoelectric bender is poly-vinylidene fluoride (PVDF).

6. The tuning mechanism for the flying pickup head in data storage devices according to claim 1, wherein said pickup head is an optical pickup head.

7. The tuning mechanism for the flying pickup head in data storage devices according to claim 1, wherein said pickup head is a magnetic pickup head.

8. The tuning mechanism for the flying pickup head in data storage devices according to claim 1, wherein said piezoelectric bender is used in an optical disk drive, a hard disk drive, or a Magneto-Optical (MO) disk drive.

* * * * *